United States Patent
Zhang et al.

(10) Patent No.: US 12,452,525 B2
(45) Date of Patent: Oct. 21, 2025

(54) PROCESSING METHOD AND ELECTRONIC DEVICE

(71) Applicant: Lenovo (Beijing) Limited, Beijing (CN)

(72) Inventors: Shanghui Zhang, Beijing (CN); Zhichao Chen, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 260 days.

(21) Appl. No.: 18/464,717

(22) Filed: Sep. 11, 2023

(65) Prior Publication Data
US 2024/0114233 A1 Apr. 4, 2024

(30) Foreign Application Priority Data
Sep. 30, 2022 (CN) .......... 202211230558.X

(51) Int. Cl.
*H04N 23/63* (2023.01)
*H04N 23/62* (2023.01)
*H04N 23/667* (2023.01)

(52) U.S. Cl.
CPC .......... *H04N 23/632* (2023.01); *H04N 23/62* (2023.01); *H04N 23/667* (2023.01)

(58) Field of Classification Search
CPC ..... H04N 23/667; H04N 23/632; H04N 23/62
USPC ...................................... 348/222.1
See application file for complete search history.

(56) References Cited

U.S. PATENT DOCUMENTS

| | | | |
|---|---|---|---|
| 9,772,863 B2* | 9/2017 | Herzi | G06F 9/44505 |
| 10,504,244 B2* | 12/2019 | Bao | G06T 7/85 |
| 10,552,983 B1* | 2/2020 | Slobodyanyuk | G06T 7/80 |
| 11,394,872 B2* | 7/2022 | Jia | G06T 7/85 |
| 11,759,709 B2* | 9/2023 | Yang | A63F 13/5252 463/31 |
| 2018/0070074 A1* | 3/2018 | Nobori | H04N 13/246 |
| 2018/0232907 A1* | 8/2018 | Sung | H04N 17/002 |
| 2019/0007589 A1* | 1/2019 | Kadambala | H04N 23/63 |
| 2019/0096091 A1* | 3/2019 | Bao | G06T 7/85 |
| 2021/0112190 A1* | 4/2021 | Jia | G06T 7/85 |
| 2021/0314496 A1* | 10/2021 | Sadhu | H04N 23/73 |
| 2022/0212104 A1* | 7/2022 | Yang | A63F 13/5252 |
| 2022/0276360 A1* | 9/2022 | Ma | G06T 7/80 |

\* cited by examiner

*Primary Examiner* — Pritham D Prabhakher
(74) *Attorney, Agent, or Firm* — ANOVA LAW GROUP, PLLC

(57) ABSTRACT

A processing method includes obtaining target configuration parameters that include a first configuration parameter for a first function module and a second configuration parameter for a second function module, initializing the first function module based at least on the first configuration parameter, initializing the second function module based at least on the second configuration parameters, and feeding back feedback information indicating completion of initialization after initialization of the first function module is completed and before initialization of the second function module is completed.

14 Claims, 6 Drawing Sheets

PROCESSING METHOD AND ELECTRONIC DEVICE

CROSS-REFERENCE TO RELATED APPLICATION

This application claim priority to Chinese Patent Application No. 202211230558.X, filed on Sep. 30, 2022, the entire content of which is incorporated herein by reference.

TECHNICAL FIELD

The present disclosure relates to the technical field of processing technology and, more particularly, to a processing method and electronic device.

BACKGROUND

Currently, during a startup process of a camera of an electronic device, initialization time is relatively long, which causes a user to feel that the startup is slow and wait time is long, thereby affecting user experience.

SUMMARY

In accordance with the disclosure, there is provided a processing method including obtaining target configuration parameters that include a first configuration parameter for a first function module and a second configuration parameter for a second function module, initializing the first function module based at least on the first configuration parameter, initializing the second function module based at least on the second configuration parameters, and feeding back feedback information indicating completion of initialization after initialization of the first function module is completed and before initialization of the second function module is completed.

Also in accordance with the disclosure, there is provided an electronic device including: one or more memories storing one or more computer programs and one or more processors configured to execute the one or more computer programs to obtain target configuration parameters that include a first configuration parameter for a first function module and a second configuration parameter for a second function module, initialize the first function module based at least on the first configuration parameter, initialize the second function module based at least on the second configuration parameters, and feed back feedback information indicating completion of initialization after initialization of the first function module is completed and before initialization of the second function module is completed.

BRIEF DESCRIPTION OF THE DRAWINGS

In order to explain the embodiments of the present disclosure more clearly, reference is made to the accompanying drawings, which are used in the description of the embodiments. Obviously, the drawings in the following description are only some embodiments of the present disclosure, and other drawings can be obtained from these drawings without any inventive effort for those of ordinary skill in the art.

DETAILED DESCRIPTION OF THE EMBODIMENTS

The technical solutions in the embodiments of the present disclosure will be described in detail with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

The embodiments of the present disclosure can be applied to an electronic device including a camera. The present disclosure does not limit product forms of the electronic device, which may include, but is not limited to, a smart phone, a tablet computer, a wearable device, a personal computer (PC), a netbook, etc., and may be selected according to application requirements.

Figure 1:
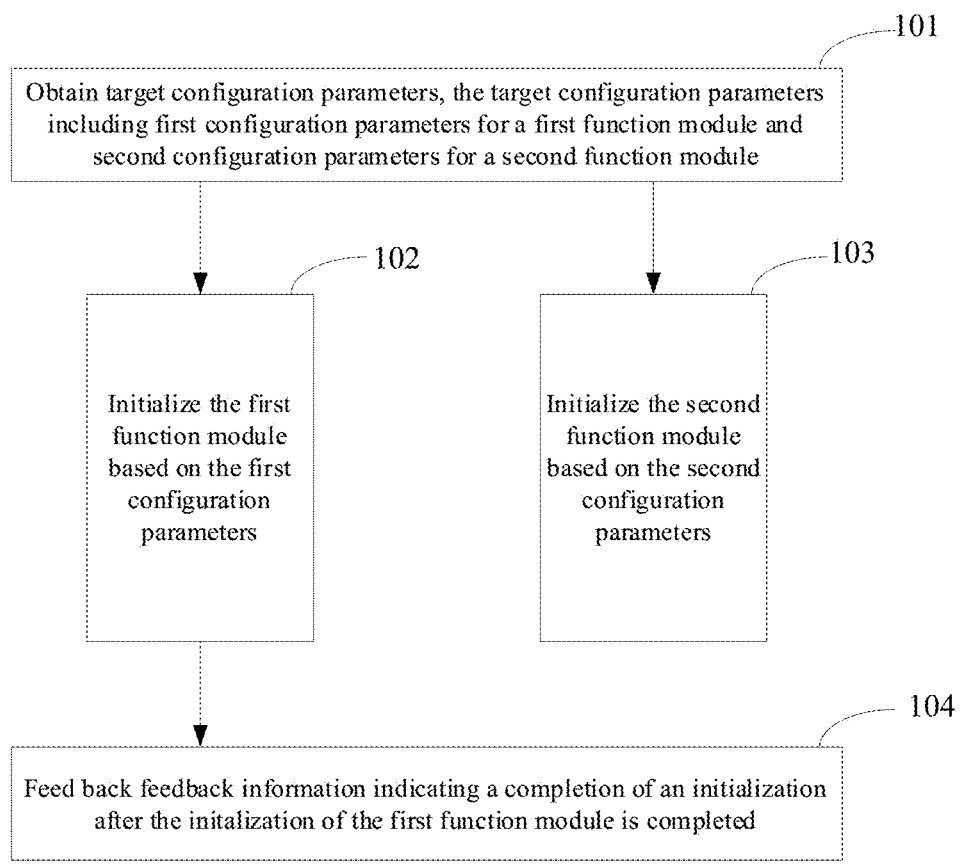
FIG. 1 is a flowchart of a processing method according to an embodiment of the present disclosure.

FIG. 1 is a flowchart of a processing method according to an embodiment of the present disclosure. The processing method shown in FIG. 1 is applied to an operating system, which realizes camera functions through interaction and cooperation with upper applications and underlying hardware during an implementation process. Referring to FIG. 1, the processing methods includes the following processes.

Process 101, obtaining target configuration parameters, the target configuration parameters including first configuration parameters for a first function module and second configuration parameters for a second function module.

The first function module may be a function module that can realize image preview, and the second function module may be a function module that can realize image collection. When the system controls to start the camera, the first function module and the second function module of the camera need to be initialized during a startup process, so that the camera can realize basic functions of image preview and image collection.

In some embodiments, when the system controls to start the camera, the target configuration parameters need to be obtained from a camera application, and the target configuration parameters may include the first configuration parameters for the first function module and the second configuration parameters for the second function module. For example, the target configuration parameters may include, but are not limited to, resolution, format, noise reduction parameters, focus parameters, etc.

Process 102, initializing the first function module based on the first configuration parameters.

After the target configuration parameters are obtained, the first function module can be controlled to initialize based on the first configuration parameters corresponding to the first function module, and an initialization result of the first function module can support providing a preview image data stream that meets configuration requirements for the upper applications. The configuration requirements correspond to the first configuration parameters, such as resolution, format, etc. of the preview image data stream. Also, in order to ensure a streaming display effect of the preview image data stream, it is needed to allocate a certain amount of memory for preview image data, such as a memory space that can store 7 to 8 frames of preview images.

An initialization process of the first function module includes sending the first configuration parameters to an underlying image signal processing system, an image sensor, etc. through interfaces. After the initialization of the first function module is completed, corresponding resources needed to realize the image preview are all ready, so that an image preview function can be realized.

Process 103, initializing the second function module based on the second configuration parameters.

Similarly, after the target configuration parameters are obtained, the second function module can be controlled to initialize based on the second configuration parameters corresponding to the second function module, and an initialization result of the second function module can support providing a collected image data stream that meets configuration requirements for the upper applications. The configuration requirements correspond to the second configuration parameters. In order to ensure a streaming display effect of the collected image data stream, it is also needed to allocate a certain amount of memory for collected image data.

After the initialization of the second function module is completed, corresponding resources needed to realize the image collection are all ready, so that real-time collected image data stream can be obtained.

A sequence of performance of the processes 102 and 103 is not limited. The processes 102 and 103 may be performed in parallel or interspersed with each other, or that the process 102 may be performed first and the process 103 is performed afterwards. FIG. 1 shows an example in which the processes 102 and 103 are performed in parallel, but does not constitute a fixed limitation to the sequence of performance of the processes 102 and 103.

Process 104, feeding back feedback information indicating a completion of an initialization after the initialization of the first function module is completed.

The feedback information indicating the completion of the initialization is fed back before the initialization of the second function module based on the second configuration parameters is completed.

Due to differences in definition and size, the preview image data usually takes up less space and resources than the collected image data, so generally speaking, time needed for the initialization of the first function module configured to realize the image preview is shorter than time needed for the initialization of the second function module configured to realize the image collection. Therefore, regardless of whether the initialization processes of the first function module and the second function module are independently performed in parallel or interspersed with each other, it is likely that a time when the first function module finishes initialization is earlier than a time when the second function module finishes initialization. In a current implementation scheme, after the target configuration parameters are obtained, an application layer is notified and camera preview and capture functions are normally enabled only after both the first function module and the second function module have completed initialization.

In a scheme of the present disclosure, although the target configuration parameters include configuration parameters for both the first function module and the second function module, after the initialization of the first function module is completed, the feedback information indicating the completion of the initialization is fed back to the application layer with no need to consider whether the initialization of the second function module is completed. The completion of the initialization indicated in the feedback information means that both the first function module and the second function module have completed initialization. Therefore, after the application layer receives the feedback information, even if the second function module has not completed the initialization, it is also considered that corresponding preparations are completed, so that the preview image data stream is obtained from a memory storing the preview image data stream in real time, and is output for display.

As such, compared with the scheme where the preview images are output after both the first function module and the second function module have completed initialization, in the scheme of the present disclosure where the preview images are output only after the initialization of the first function module is completed, time from starting the camera application to displaying the preview images on a display screen can be effectively shortened, which weakens user's sense of waiting for starting the camera application.

In the processing method consistent with the present disclosure, the feedback information indicating that all modules have completed initialization is fed back to the upper application after the initialization of the first function module is completed, so that corresponding application functions can be enabled faster, which reduces time for the user to wait for the initialization and improves user experience.

In the above embodiments, the target configuration parameters are configuration parameters corresponding to a target application program (camera application) being in a target mode, and the target mode is one of multiple operation modes of the application program.

The camera application has a variety of operation modes adapted to different scenarios and user needs, such as regular mode, portrait mode, night scene mode, beauty mode, etc. For different operation modes, some parameters and some used processing algorithms of the preview images and captured images are different, so corresponding configuration parameters in different operation modes are also different.

In some embodiments, initializing the first function module based on the first configuration parameters at least includes loading a first resource based on the first configuration parameters, so that the target mode realizes a preview function. Initializing the second function module based on the second configuration parameters at least includes loading a second resource based on the second configuration parameters, so that the target mode realizes a capture function. An implementation of the capture function herein may be taking pictures or video recordings.

The first resource may be a resource that can support obtaining the preview image data stream, including some processing algorithms for the preview images, memory space for storing the preview images, etc. The second resource is a resource that can support the collection of the collected image data stream, including some processing algorithms for the collected images, memory space for storing the collected images, etc.

As such, after the feedback information indicating the completion of the initialization is fed back, a first image data stream can be provided based on the first resource in response to a request for the preview image data stream, and the request for the preview image data stream comes from the target application program. After the initialization of the second function module is completed, a second image data stream can be provided based on the second resource in response to a request for the collected image data stream, and the request for the collected image data stream comes from the target application program.

As described above, the first function module is a function module that can obtain the preview image data stream. After the initialization, if the request for the preview image data stream sent by the target application program (camera application) is received, the preview image data obtained by real-time processing based on the first resource and stored in a preview image data memory is provided to the target application program in a form of data flow.

Similarly, the second function module is a function module that can obtain the collected image data stream. After the initialization, if the request for the collected image data stream sent by the target application program (camera application) is received, the collected image data obtained by real-time processing based on the second resource and stored in a collected image data memory is provided to the target application program in a form of data flow.

Due to differences in standards of the preview images and the collected images, such as resolution, format, etc., the processing algorithm in the first resource is at least partially different from the processing algorithm in the second resource. The processing algorithm in the first resource has been loaded into the memory when the first function module loads the first resource, and the processing algorithm in the second resource has been loaded into the memory when the second function module loads the second resource, so as to be used at any time.

Figure 2:
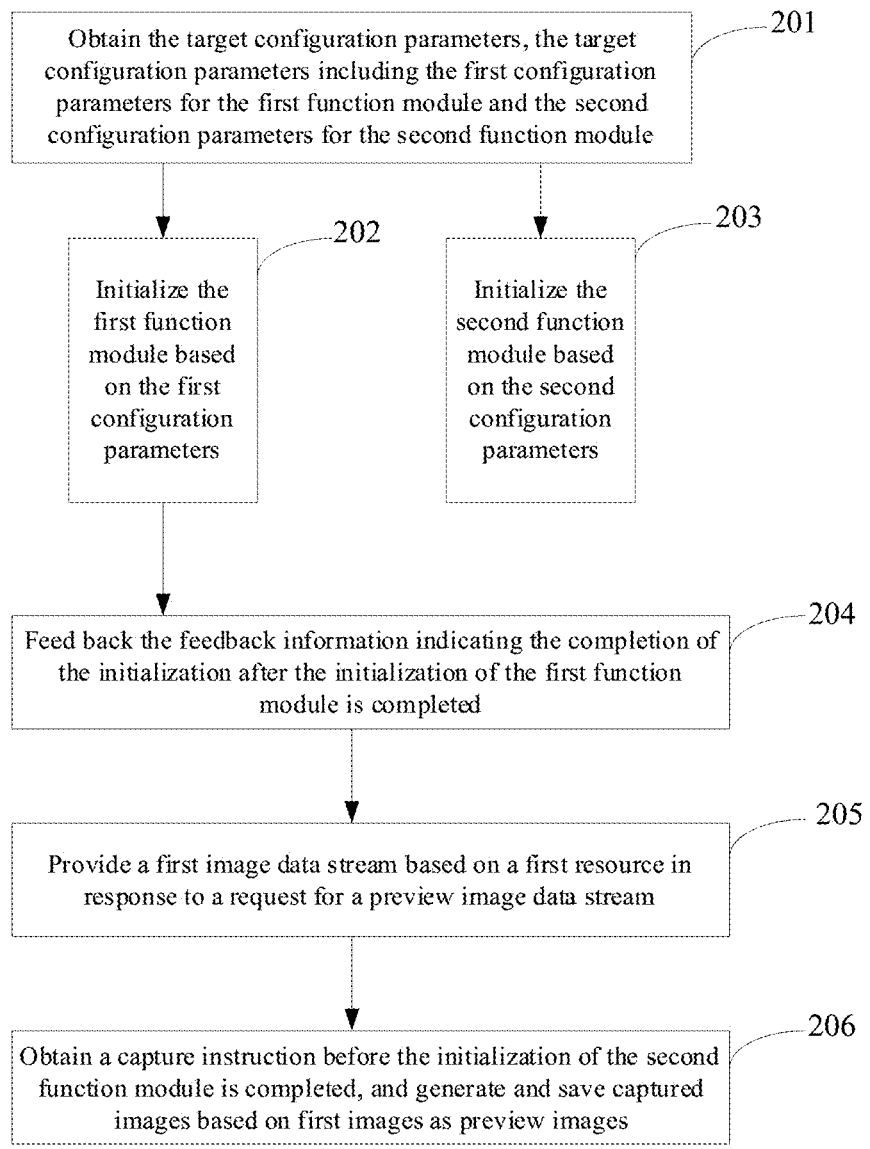
FIG. 2 is a flowchart of another processing method according to an embodiment of the present disclosure.

FIG. 2 is a flowchart of another processing method according to an embodiment of the present disclosure. As shown in FIG. 2, the processing method includes the following processes.

Process 201, obtaining the target configuration parameters, the target configuration parameters including the first configuration parameters for the first function module and the second configuration parameters for the second function module.

Process 202, initializing the first function module based on the first configuration parameters.

Process 203, initializing the second function module based on the second configuration parameters.

Process 204, feeding back the feedback information indicating the completion of the initialization after the initialization of the first function module is completed.

The feedback information indicating the completion of the initialization is fed back before the initialization of the second function module based on the second configuration parameters is completed.

Process 205, providing the first image data stream based on the first resource in response to the request for the preview image data stream.

Process 206, obtaining a capture instruction before the initialization of the second function module is completed, and generating and saving the captured images based on first images as the preview images.

In an implementation scenario, when the first function module has completed initialization but the second function module has not completed the initialization, if the capture instruction issued by the camera application is obtained, it is needed to obtain the captured images in other manners since the collected image data stream has not been provided to the camera application.

Based on the first images as the preview images, a process of generating and saving the captured images is performed by the target application program, i.e., the camera application. After the capture instruction is obtained, it is needed to process the obtained preview images to obtain the captured images since the target application program has not been obtained the collected image data stream.

Generating and saving the captured images based on the first images as the preview images may include processing the first images based on a target algorithm to generate the captured images, and saving the captured images.

The target algorithm may include, but is not limited to, an interpolation algorithm, a super-resolution algorithm, etc.

Due to the differences in resolution, format, etc. of the preview images and the captured images, it is needed to process the preview images to obtain the captured images conforming to standard of the captured images. For example, the target application program can process the preview images by calling some algorithm modules (corresponding to the target algorithm) thereof to obtain the captured images.

Figure 3:
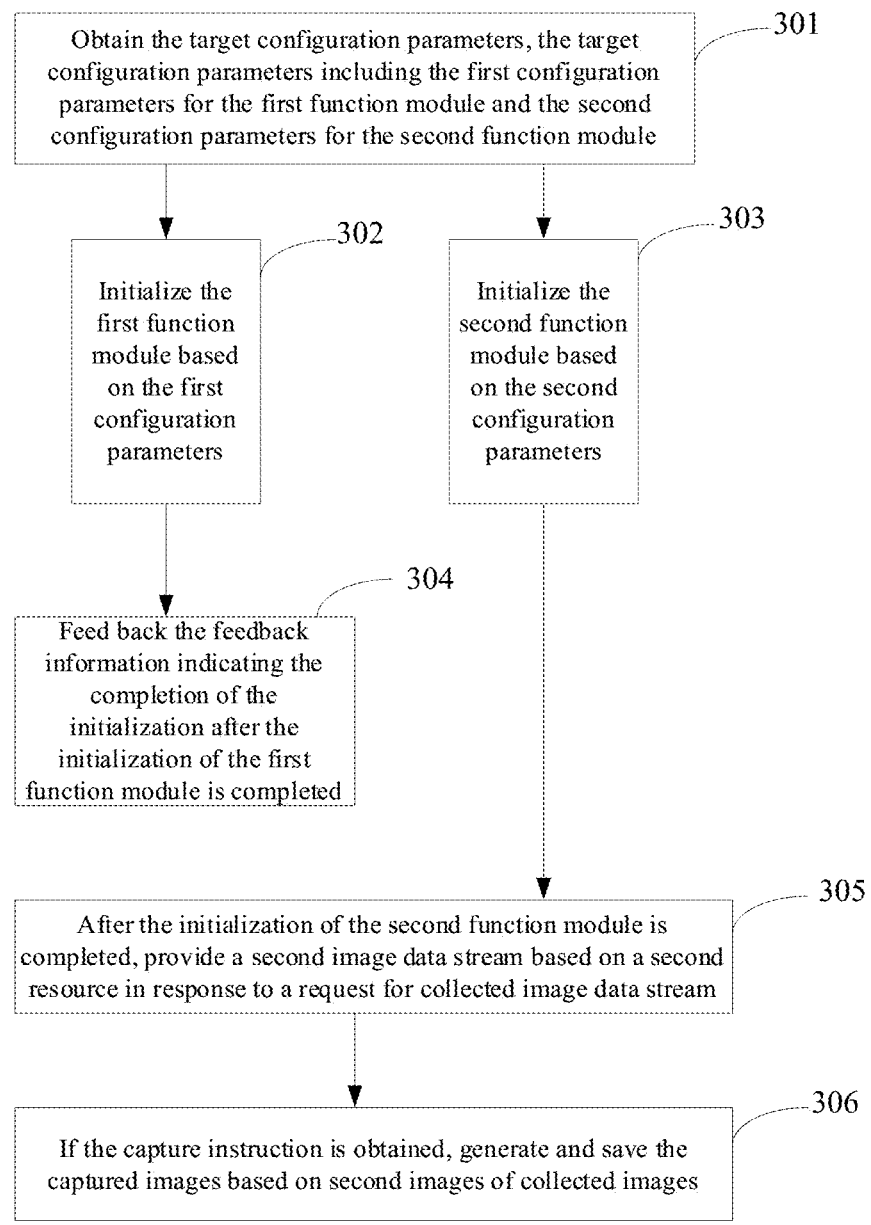
FIG. 3 is a flowchart of another processing method according to an embodiment of the present disclosure.

FIG. 3 is a flowchart of another processing method according to an embodiment of the present disclosure. As shown in FIG. 3, the processing method includes the following processes.

Process 301, obtaining the target configuration parameters, the target configuration parameters including the first configuration parameters for the first function module and the second configuration parameters for the second function module.

Process 302, initializing the first function module based on the first configuration parameters.

Process 303, initializing the second function module based on the second configuration parameters.

Process 304, feeding back the feedback information indicating the completion of the initialization after the initialization of the first function module is completed.

The feedback information indicating the completion of the initialization is fed back before the initialization of the second function module based on the second configuration parameters is completed.

Process 305, after the initialization of the second function module is completed, providing the second image data stream based on the second resource in response to the request for the collected image data stream.

Process 306, if the capture instruction is obtained, generating and saving the captured images based on second images of the collected images.

In an implementation scenario, after the initialization of the second function module is completed, the collected image data stream can already be provided to the target application program based on the second resource. The same as in a conventional scheme, if the capture instruction issued by the camera application is obtained, the captured images are directly generated and saved based on the second images of the collected images.

In some embodiments, generation of the captured images is controlled and performed by a hardware abstraction layer of the camera. Since the second function module has been initialized, when the capture instruction is obtained, the collected image data may be provided to the target application program based on the hardware abstraction layer to obtain the captured images as in the conventional scheme.

Figure 4:
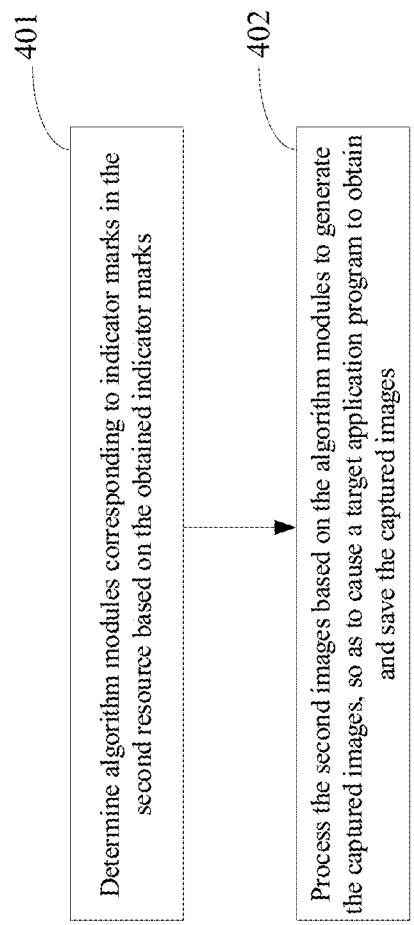
FIG. 4 is a flowchart showing generating and saving captured images according to an embodiment of the present disclosure.

For example, FIG. 4 shows a process of generating and saving the captured images in some embodiments. As shown in FIG. 4, generating and saving the captured images based on the second image of the collected images includes the following processes.

Process 401, based on obtained indicator marks, determining algorithm modules corresponding to indicator marks in the second resource.

The indicator marks include focus marks, aperture marks, etc. These indicator marks represent a processing effect that the user wants. Therefore, before the preview images or the captured images are generated, it is needed to perform corresponding processing on the collected images, so that the processed images correspond to the indicator marks. In some embodiments, after the indicator marks are obtained, it is first needed to determine the algorithm modules corresponding to the indicator marks in the second resource.

Process 402, processing the second images based on the algorithm modules to generate the captured images, so as to cause the target application program to obtain and save the captured images.

Since the algorithm modules corresponding to the indicator marks have been loaded into a system memory during the initialization process, when it is determined to use the algorithm modules to process the images, the second images are directly processed to generate the captured images corresponding to the indicator marks that satisfy the user needs.

Figure 5:
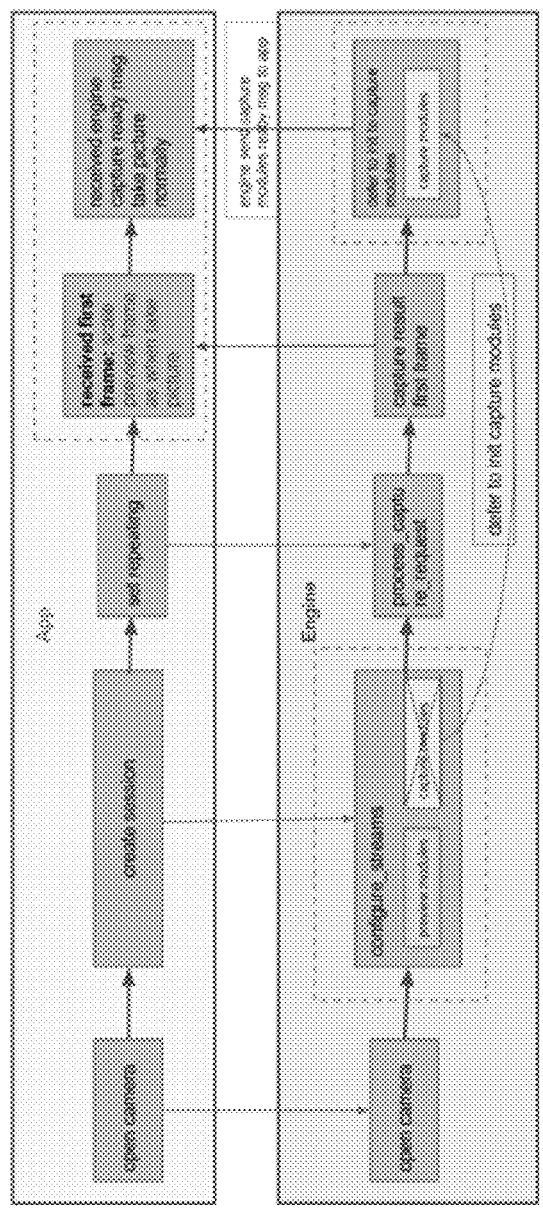
FIG. 5 is a schematic diagram showing an implementation principle of a processing method according to an embodiment of the present disclosure.

FIG. 5 is a schematic diagram showing an implementation principle of a processing method according to an embodiment of the present disclosure. An interaction working process of APP and kernel Engine is shown, and work contents marked by dotted line boxes are different from that in the conventional scheme. An implementation of deferring an initialization of a capture function module (the second function module) is shown in a kernel workflow.

As shown in FIG. 5, in an implementation, after a camera startup instruction is received, the APP creates a session (create session) and sends configuration parameters needed for initializations of a preview function module (the first function module) and the capture function module (the second function module) to the kernel, and the kernel completes the initialization of the preview function module. The APP subsequently requests data from the kernel (set repeating), and the kernel returns a preview data stream to the APP responding to the request and then continues to initialize the capture function module. The APP receives the preview data stream and subsequently receives a capture instruction. If the capture function module has not been initialized at this time, the preview images are processed into the captured images; if the capture function module has been initialized at this time, the captured images are directly obtained based on the collected images provided by the capture function module.

Referring to FIG. 5, in the conventional scheme, a process from starting the camera to taking pictures can be: starting the camera, initializing the preview function module and the capture function module, starting a preview image stream, and obtaining the capture instruction to obtain the captured images by using the capture function module.

In the scheme of the present disclosure, the process from starting the camera to taking pictures can be: starting the camera, initializing the preview function module, starting the preview image stream, obtaining the capture instruction and obtaining the captured images by using the preview image stream, initializing the capture function module, and obtaining the capture instruction to obtain the captured images by using the capture function module.

According to the processing method in the scheme of the present disclosure, the initialization of the capture function module is deferred, which greatly reduces time from starting the camera to obtaining the preview image stream, so that waiting time of the user is reduced and the user experience is optimized.

The aforementioned embodiments of the method are described as a series of performance combinations for the sake of simple description, but those skilled in the art should know that the present disclosure is not limited by the described performance order, since some processes may be performed in other orders or simultaneously according to the present disclosure. Also, those skilled in the art should know that the embodiments described in this specification are just some embodiments, and the performances and modules involved are not necessarily needed by the present disclosure.

The method consistent with the present disclosure is described in detail in the above-mentioned embodiments, and the method consistent with the present disclosure can be realized by various forms of apparatuses. Therefore, the present application also provides an apparatus, and some embodiments are described in detail below.

Figure 6:
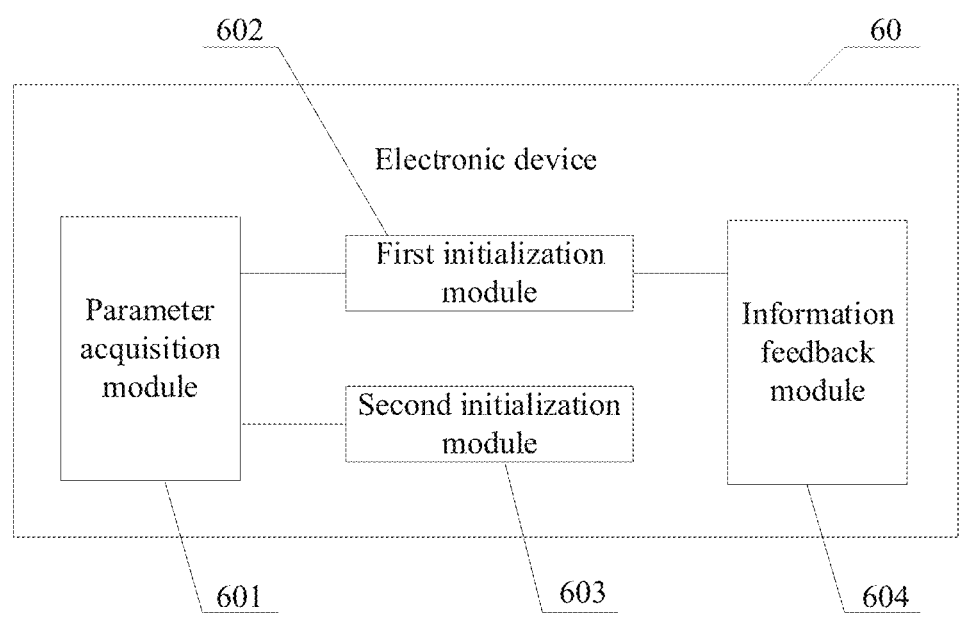
FIG. 6 is a schematic structural diagram of an electronic device according to an embodiment of the present disclosure.

FIG. 6 is a schematic structural diagram of an electronic device according to an embodiment of the present disclosure. Referring to FIG. 6, an electronic device 60 includes a parameter acquisition module 601, a first initialization module 602, a second initialization module 603, and an information feedback module 604. The parameter acquisition module 601 is configured to obtain the target configuration parameters, where the target configuration parameters include the first configuration parameters for the first function module and the second configuration parameters for the second function module. The first initialization module 602 is configured to initialize the first function module based on the first configuration parameters. The second initialization module 603 is configured to initialize the second function module based on the second configuration parameters. The information feedback module 604 is configured to feed back the feedback information indicating the completion of the initialization after the initialization of the first function module is completed. The feedback information indicating the completion of the initialization is fed back before the initialization of the second function module based on the second configuration parameters is completed.

In a processing apparatus consistent with the present disclosure, the feedback information indicating that all modules have completed initialization is fed back to the upper application after the initialization of the first function module is completed, so that the corresponding application functions can be enabled faster, which reduces the time for the user to wait for the initialization and improves the user experience.

The parameter acquisition module, the first initialization module, the second initialization module, and the information feedback module are located at the hardware abstraction layer of the camera. The parameter acquisition module obtains the target configuration parameters from the application layer. After the first initialization module has completed initialization, the preview image data stream is provided for the application layer. After the second initialization module has completed initialization, the collected image data stream is provided for the application layer. The information feedback module feeds back the feedback information to the application layer.

In an implementation, the target configuration parameters are the configuration parameters corresponding to the target application program being in the target mode, and the target mode is one of the multiple operation modes of the application program. The first initialization module can be configured to load the first resource based on the first configuration parameters, so that the target mode realizes the preview function. The second initialization module can be configured to load the second resource based on the second configuration parameters, so that the target mode realizes the capture function.

In an implementation, the electronic device also includes a first response module and a second response module. The first response module is configured to provide the first image data stream based on the first resource in response to the request for the preview image data stream after the feedback information indicating the completion of the initialization is fed back, where the request for the preview image data stream comes from the target application program. The second response module is configured to provide the second image data stream based on the second resource in response to the request for the collected image data stream after the initialization of the second function module is completed, where the request for the collected image data stream comes from the target application program.

In an implementation, the electronic device also includes a first processing module, which is configured to obtain the capture instruction before the initialization of the second function module is completed, and generate and save the captured images based on the first images as the preview images.

In an implementation, the first processing module may be configured to process the first images based on the target algorithm to generate the captured images, and save the captured images.

In an implementation, the electronic device also includes a second processing module, which is configured to obtain the capture instruction after the initialization of the second function module is completed, and generate and save the captured images based on the second images of the collected images.

In an implementation, the second processing module may be configured to determine the algorithm modules corresponding to the indicator marks in the second resource based on the obtained indicator marks, and process the second images based on the algorithm modules to generate the captured images, so as to cause the target application program to obtain and save the captured images.

In an implementation, among the multiple operation modes of the application program, different operation modes correspond to different configurations.

Any electronic device described in the above embodiments includes a processor and a memory. The parameter acquisition module, the first initialization module, the second initialization module, the information feedback module, the first response module, the second response module, the first processing module, and the second processing module in the above embodiments are all stored in the memory as program modules, and the processor executes the program modules stored in the memory to realize corresponding functions.

The processor includes the kernel, and the kernel fetches corresponding program modules from the memory. There may be one or more kernels, and return visit data may be processed by adjusting kernel parameters.

The memory may include non-permanent memory, random access memory (RAM), and/or non-volatile memory in computer-readable media, such as read-only memory (ROM) or flash memory (flash RAM). The memory includes at least one memory chip.

In some embodiments, a computer-readable storage medium is also provided, which can be directly loaded into an internal memory of a computer, and contains software codes. After the computer program is loaded and executed by the computer, the processes of any of the processing method consistent with the present disclosure described above can be realized.

In some embodiments, a computer program product is also provided, which can be directly loaded into the internal memory of the computer, and contains software codes. After the computer program is loaded and executed by the computer, the processes of any of the processing method consistent with the present disclosure described above can be realized.

The various embodiments in this specification are described in a progressive manner. Each embodiment focuses on the differences from other embodiments, and for the same or similar parts between the various embodiments, reference can be made to each other. For the apparatuses disclosed in the embodiments, since they correspond to the methods disclosed in the embodiments, the descriptions are relatively simple, and for relevant information, reference can be made to the descriptions of the methods.

Relational terms such as first and second are only used herein to distinguish one entity or operation from another entity or operation, and do not necessarily require or imply any such actual relationship or order between these entities or operations. The terms "include," "involve" or any other variations thereof are intended to cover non-exclusive inclusion, so that a process, method, object, or device including a series of elements not only includes those elements, but also includes other elements that are not explicitly listed, or also includes elements inherent to such processes, method, object, or device. Without further restrictions, the element associated with phrase "including a . . . " does not exclude the existence of other identical elements in the process, method, object, or device that includes the element.

The processes of the methods or algorithms described with reference to the embodiments disclosed herein may be directly implemented by hardware, software modules executed by a processor, or a combination of the two. The software modules can be provided in a random access memory (RAM), an internal memory, a read-only memory (ROM), an electrically programmable ROM, an electrically erasable programmable ROM, a register, a hard disk, a removable disk, a CD-ROM, or any other form of storage medium known in the technical field.

The foregoing description of the disclosed embodiments enables those skilled in the art to implement or use the present disclosure. Various modifications to these embodiments will be obvious to those skilled in the art, and the general principles defined herein can be implemented in other embodiments without departing from the spirit or scope of the present disclosure. Therefore, the present disclosure is not limited to the embodiments shown herein, but should conform to the widest scope consistent with the principles and novel features disclosed herein.

What is claimed is:

1. A processing method for a camera, comprising:
obtaining target configuration parameters, the target configuration parameters including a first configuration parameter for a first function module and a second configuration parameter for a second function module;
initializing the first function module based at least on the first configuration parameter;
initializing the second function module based at least on the second configuration parameters; and
feeding back feedback information indicating completion of initialization after initialization of the first function module is completed and before initialization of the second function module is completed;

wherein:

feeding back of the feedback information enables provision of a first image data stream based on a first resource in response to a request for a preview image data stream, the request for the preview image data stream coming from a target application program; and the completion of the initialization of the second function module enables provision of a second image data stream based on a second resource in response to a request for a collected image data stream, the request for the collected image data stream coming from the target application program.

2. The processing method of claim 1, wherein:

the target configuration parameters include configuration parameters corresponding to the target application program being in a target mode, the target mode being one of a plurality of operation modes of an application program;

initializing the first function module based at least on the first configuration parameter includes loading the first resource based at least on the first configuration parameter, so that the target mode realizes a preview function; and initializing the second function module based at least on the second configuration parameter includes loading the second resource based at least on the second configuration parameter, so that the target mode realizes a capture function.

3. The processing method of claim 2, wherein different ones of the plurality of operation modes correspond to different configurations.

4. The processing method of claim 1, further comprising, before the initialization of the second function module is completed:

generating and saving a captured image based on a preview image in response to obtaining a capture instruction.

5. The processing method of claim 4, wherein generating and saving the captured image based on the preview images includes:

processing the preview image based on a target algorithm to generate the captured image; and saving the captured image.

6. The processing method of claim 1, further comprising, after the initialization of the second function module is completed:

generating and saving a captured image based on a collected image in response to obtaining a capture instruction.

7. The processing method of claim 6, wherein generating and saving the captured image based on the collected image includes:

based on an obtained indicator mark, determining an algorithm module corresponding to the indicator mark in the second resource; and processing the collected image based on the algorithm module to generate the captured image, so as to cause the target application program to obtain and save the captured image.

8. An electronic device including a camera, comprising:

one or more memories storing one or more computer programs; and one or more processors configured to execute the one or more computer programs to:

obtain target configuration parameters, the target configuration parameters including a first configuration parameter for a first function module and a second configuration parameter for a second function module;

initialize the first function module based at least on the first configuration parameter;

initialize the second function module based at least on the second configuration parameters;

feed back feedback information indicating completion of initialization after initialization of the first function module is completed and before initialization of the second function module is completed;

provide, after feeding back the feedback information, a first image data stream based on a first resource in response to a request for a preview image data stream, the request for the preview image data stream coming from a target application program; and provide, after completing the initialization of the second function module, a second image data stream based on a second resource in response to a request for a collected image data stream, the request for the collected image data stream coming from the target application program.

9. The electronic device of claim 8, wherein:

the target configuration parameters include configuration parameters corresponding to the target application program being in a target mode, the target mode being one of a plurality of operation modes of an application program; and the one or more processors are further configured to execute the one or more computer programs to:

load the first resource based at least on the first configuration parameter, so that the target mode realizes a preview function; and load the second resource based at least on the second configuration parameter, so that the target mode realizes a capture function.

10. The electronic device of claim 9, wherein different ones of the plurality of operation modes correspond to different configurations.

11. The electronic device of claim 8, wherein the one or more processors are further configured to execute the one or more computer programs to, before the initialization of the second function module is completed:

generate and sav a captured image based on a preview image in response to obtaining a capture instruction.

12. The electronic device of claim 11, wherein the one or more processors are further configured to execute the one or more computer programs to:

process the preview image based on a target algorithm to generate the captured image; and save the captured image.

13. The electronic device of claim 8, wherein the one or more processors are further configured to execute the one or more computer programs to, after the initialization of the second function module is completed:

generate and save a captured image based on a collected image in response to obtaining a capture instruction.

14. The electronic device of claim 13, wherein the one or more processors are further configured to execute the one or more computer programs to:

based on an obtained indicator mark, determine an algorithm module corresponding to the indicator mark in the second resource; and process the collected image based on the algorithm module to generate the captured image, so as to cause the target application program to obtain and save the captured image.

* * * * *